April 29, 1952   S. FLAM   2,594,760
MOLDING APPARATUS

Filed April 14, 1947   9 Sheets-Sheet 2

INVENTOR
Stephen Flam
BY John Flam
ATTORNEY

April 29, 1952     S. FLAM     2,594,760
MOLDING APPARATUS
Filed April 14, 1947     9 Sheets-Sheet 3

INVENTOR
Stephen Flam
BY John Flam
ATTORNEY

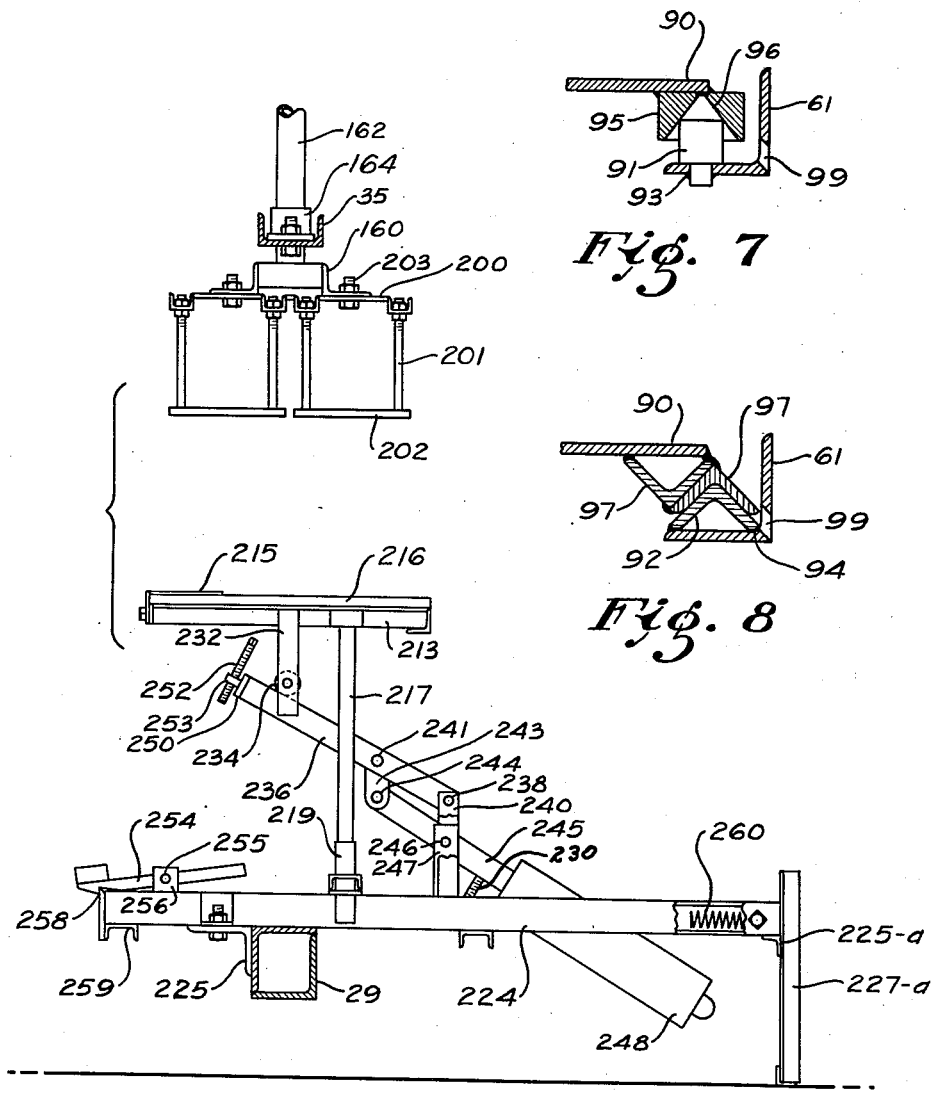

April 29, 1952     S. FLAM     2,594,760
MOLDING APPARATUS

Filed April 14, 1947     9 Sheets-Sheet 5

INVENTOR
Stephen Flam
BY
ATTORNEY

April 29, 1952  S. FLAM  2,594,760
MOLDING APPARATUS
Filed April 14, 1947  9 Sheets-Sheet 6
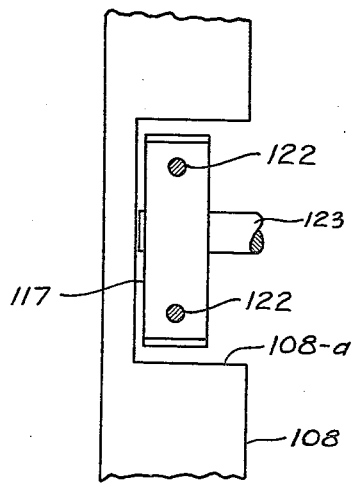
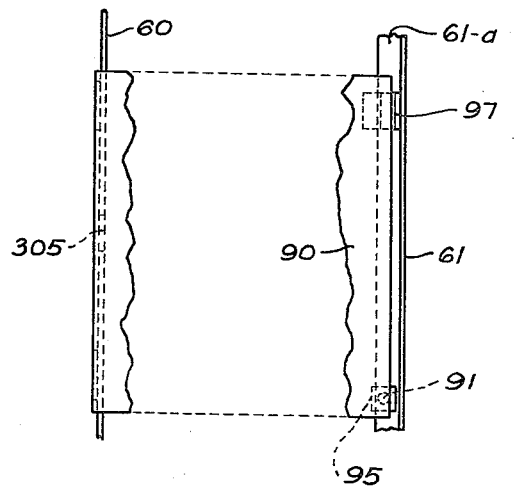
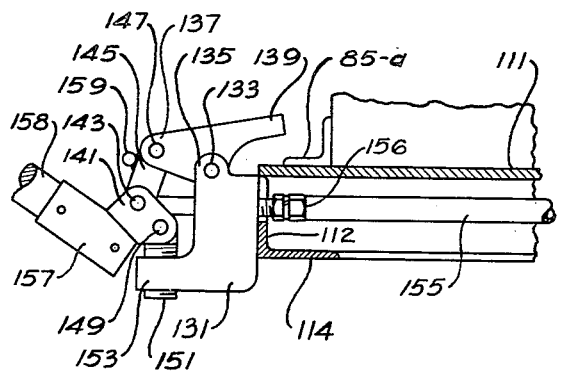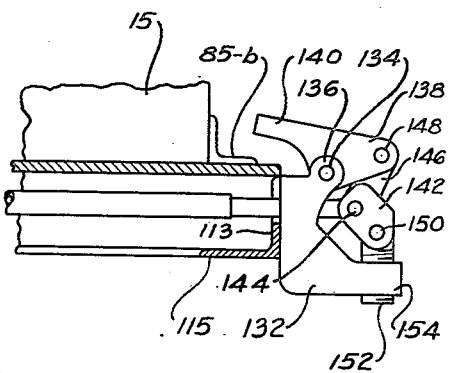
INVENTOR
Stephen Flam
BY John Flam
ATTORNEY INVENTOR
Stephen Flam
BY John Flam
ATTORNEY INVENTOR
Stephen Flam
BY John Flam
ATTORNEY April 29, 1952 S. FLAM 2,594,760
MOLDING APPARATUS
Filed April 14, 1947 9 Sheets-Sheet 9

INVENTOR
Stephen Flam
BY John Flam
ATTORNEY

Patented Apr. 29, 1952

2,594,760

UNITED STATES PATENT OFFICE 2,594,760

MOLDING APPARATUS

Stephen Flam, Sherman Oaks, Calif.; John Flam, Joseph Flam, and August Flam executors of said Stephen Flam, deceased Application April 14, 1947, Serial No. 741,223

6 Claims. (Cl. 25—41)

This invention relates to block molding machines, and more particularly to a type in which blocks, tile, brick, or slabs are formed from plastic compositions, such as cement, concrete, or porous rock.

It is now well known to provide a vibratory support for the mold during the process of filling the mold. Usually, there is provided a stripper mechanism to which the filled mold is moved by a transfer mechanism to a station for pressing the molded article out of the mold.

An object of this invention is to provide for stripping cast objects from molds by aid of a mechanism that can exert a large force to start the stripping action, and that can, thereafter, rapidly move the stripper through the remainder of its stripping action.

Another object of this invention is the provision of stripper mechanism for molds, comprising dual lever mechanism initially operating to exert a large force to start the stripping action and thereafter to accelerate the movement of the stripper.

In such apparaus for molding blocks utilizing a stripper, the upper surfaces of the blocks are substantially entirely engaged by the stripper device to exert a substantially uniform stripping action over the block area. Accordingly, the filled mold must be quite accurately aligned with the stripper. Since a transfer frame is used to lift the filled mold from the casting station and to move it underneath the stripper, the necessity of alignment also requires that the mold assume a definite position with respect to the transfer device. It is another object of this invention to provide a transfer device that can cooperate effectively to maintain the required alignment of the mold to the stripper.

This invention possesses many other advantages, and has other objects which may be made more clearly apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Fig. 4 is a side elevational view, partly in section, taken along plane 4—4 of Fig. 1;

Fig. 7 is a sectional view taken along plane 7—7 of Fig. 2;

Fig. 8 is a sectional view taken along plane 8—8 of Fig. 2;

Fig. 10 is an enlarged detail, partly in section, and partly broken away, of the mold clamping mechanism;

Fig. 11 is a diagrammatic view taken along plane 11—11 of Fig. 1;

Fig. 12 is a detailed diagrammatic view of the mold centering mechanism;

Figure 1:
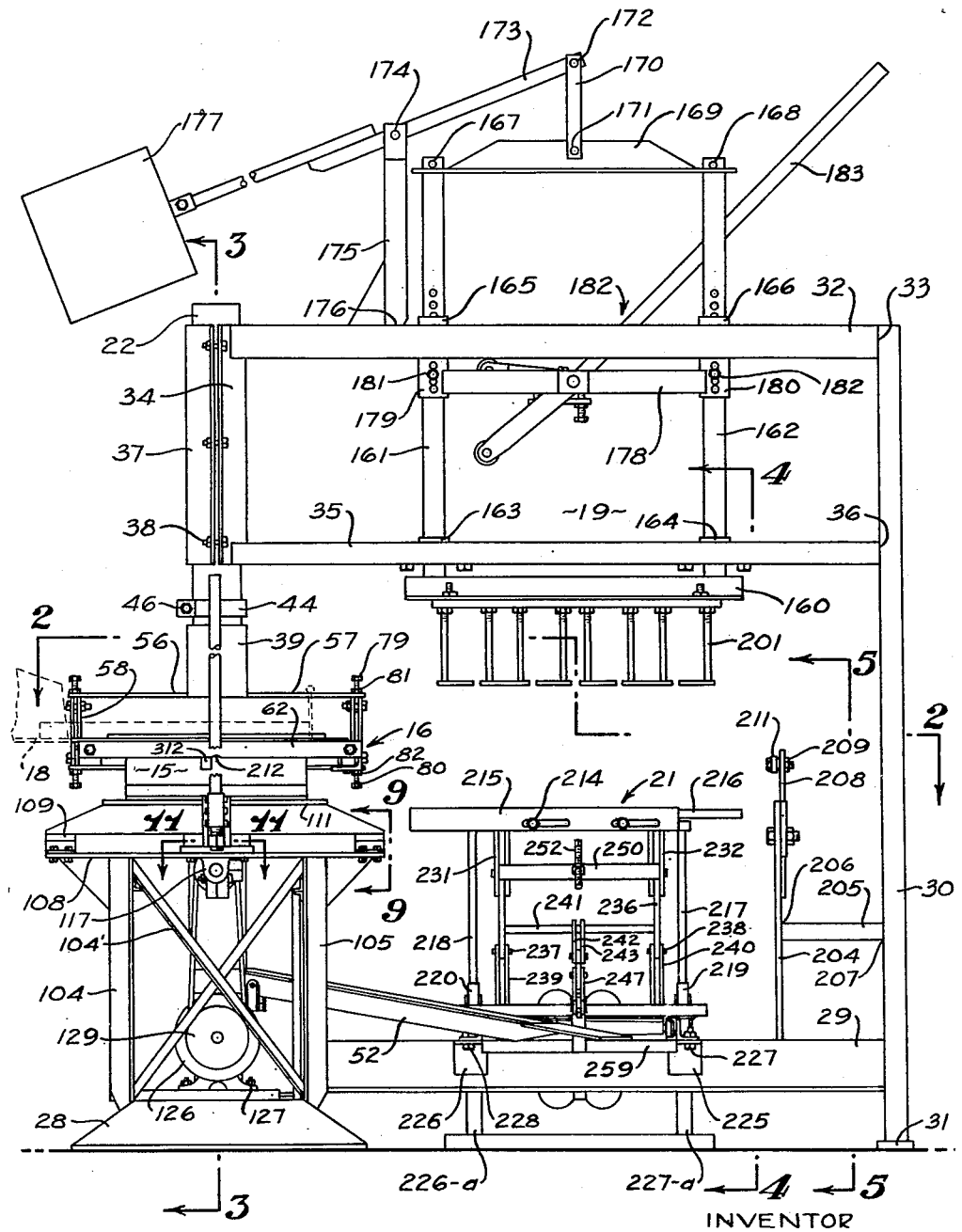
Figure 1 is a front elevational view of a molding machine, incorporating the invention.

In the drawings, mold structure 15 (Figs. 1, 2, and 3) is shown as providing mold spaces for the molding of one or more blocks, bricks, slabs, or tiles from plastic material, such as concrete or cement of appropriate proportions. The mold is adapted to be carried in a horizontally disposed frame 16 supported to be revoluble about an axis 17, whereby the compactly filled mold may be moved from the filling station 18 through an angle of 90° to the press and stripper mechanism 19. The molded block 20 is then stripped from the mold on to the collapsible pallet 21 and finally removed by an operator. The horizontal frame 16 is returned to its initial position at the filling station with the mold in position to be again filled and compacted by the filling mechanism later to be described.

The relative positioning of the filling and stripping mechanism at substantially right angles, and the pivoting of the mold supporting frame on the axis of the angle, expedites the manual operations and increases block production. By using an open-ended mold structure 15 which permits filling and stripping of the mold without inversion, the block molding operation is still further hastened.

Figure 2:
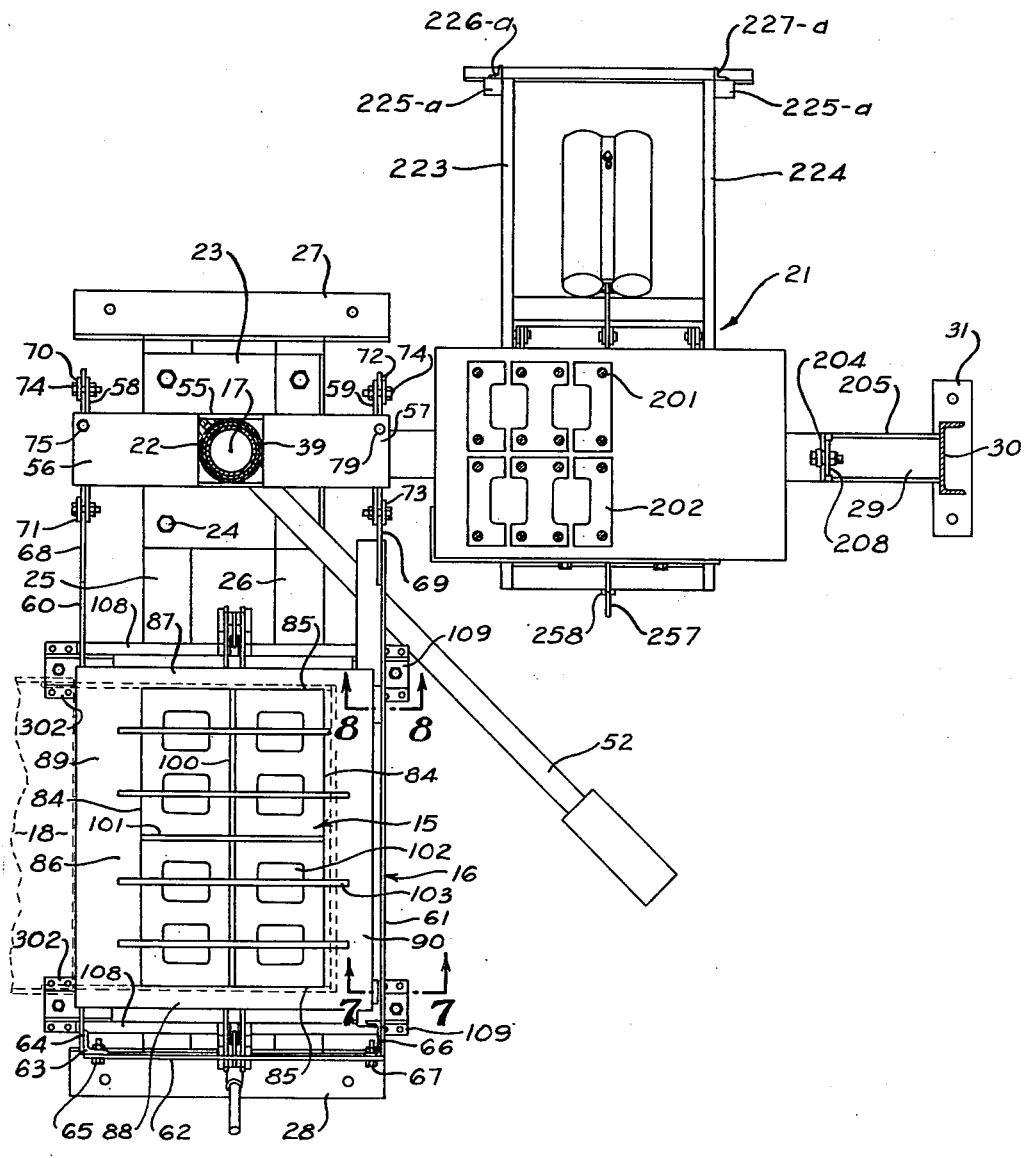
Fig. 2 is a top plan view, partly in section, taken along plane 2—2 of Fig. 1.

A cylindrical post or column 22 (Figs. 1, 2, 3 and 6) provides the before mentioned axis 17. The column 22 rises vertically from the base or foundation, said base comprising the following elements: column 22 is welded at its lower end to plate 23 (Figs. 2 and 3), said plate being bolted in the plural manner 24 on horizontally disposed dual base members 25 and 26, which may be conveniently formed of angle irons or bed plates. These base members are disposed in parallel relationship (Fig. 2). The ends of bed plates 25 and 26 have welded thereto angle iron members 27 and 28, which members also form a part of the heavy foundation.

Adjacent the ends of parallel base plates 25 and 26 is supported the mold filling and vibrating mechanism later to be described. The stripper and presser 19 is supported by the aid of the plates 25 and 26 in a manner now to be described. Welded to the top of plate 23, and projecting therefrom in a right angular manner with respect to bed plates 25 and 26, is a hollow base bar 29, said member being welded at its outer end to a vertically disposed channel iron 30. As shown most clearly in Fig. 4, the brace 29 may be conveniently formed of a pair of angle irons welded together. Base member 29 is welded to vertical support 30 at a point near the lower end of said support, with the result that said base portion 29 is elevated from the ground. The lower end of support 30 has a steel foot member 31 welded thereto in a manner to form a ground support.

A horizontally disposed brace 32, such as an I beam, is welded at 33 to the upper end of said vertical support 30, the other end of said brace being welded to the upper end of an elongated clamp section 34 surrounding the upper end of the cylindrical post 22. A second brace or channel 35 is spaced some distance below the beforementioned brace 32, and is welded at one end at 36 to vertical support 30, and at its other end to the lower end of the elongated clamp member 34. Both of these braces may be made from channel irons. An opposed clamp section 37, shaped similarly to section 34, is bolted in the plural manner shown at 38 to the first-mentioned clamp 34. This manner of connecting the elevated braces 32 and 35 to the upper end of the cylindrical post 22 completes the rigid framework upon which the press and mold stripping mechanism, later to be described, is mounted.

There will now be described the frame support for the mold 15, and which is rotatably mounted on the column 22. This frame serves, as will be described hereinafter, to move the filled mold to the stripper mechanism.

Telescoped upon the column 22 below the beforementioned elongated clamp members 34 and 37 is a pipe 39. The pipe 39 has bushings 40 and 41 pressed into its upper and lower ends 42 and 43 respectively. These bushings ensure a bearing fit for the pipe upon the column, but they still permit vertical movement thereof between the upper stop collar 44 and lower stop collar 45. Said stop collar 44 is clamped to the column 22 in the manner shown at 46 (Fig. 1).

The enlarged detail (Fig. 6) shows clearly the mechanism for elevating or lowering the telescoping pipe 39 on cylindrical column 22, whereby mold 15 may be raised or lowered with respect to the vibrator mechanism. The clamp or collar 45 is securely positioned on post 22 by means of the bolted connections 47 and 48 at a point near the lower end thereof. Extended horizontal portion 49 of the collar 45 has a vertically disposed U-shaped ear 50 welded thereto. Pivoted as at 51 to the ear 50 is an elongated foot-operated lever or pedal 52. This pedal, as shown most clearly in Fig. 2, extends conveniently for operation in a diagonal manner between the filling and stripping stations. The inner end of lever 52 has a pipe-engaging and actuating portion 53, either formed as a part thereof or welded thereto. The portion 53 conforms in shape to column 22, and is movable thereon under the lower end of the pipe 39 in a manner to raise or lower said pipe within the limits of stop collars 44 and 45. It is apparent that variable adjustment of the telescoping cylinder 39 may be obtained by adjusting the position of stops 44 and 45.

Figure 18:
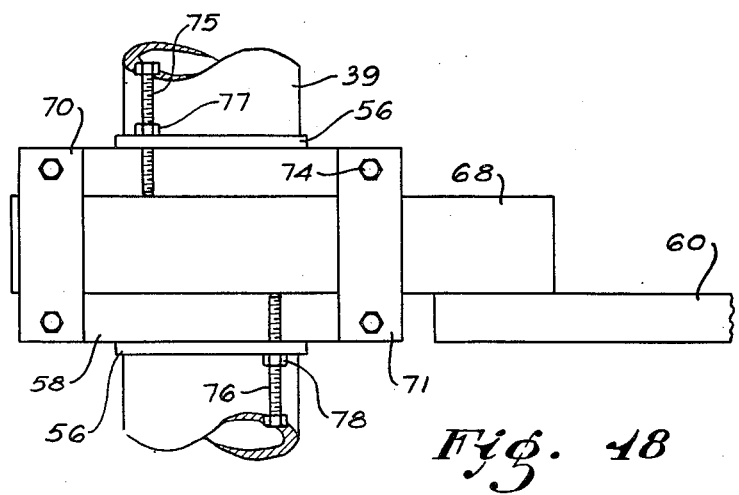
Fig. 18 is a detail elevational view of the adjustable mounting for the mold support.

In order to support the mold transfer frame by aid of the angularly adjustable pipe section 39, a pair of arms 54 and 55 (Figs. 2 and 3) are joined, as by welding, to diametrically opposite points on pipe 39. Dual cover plates 56 and 57 are attached to the upper and lower edges of plates 54 and 55, as well as to the telescoping pipe 39. Plates 56 and 57 extend slightly beyond the ends of members 54 and 55. End plates 58 and 59 are attached to the projecting outer ends of vertical plates 54 and 55, said end plates extending horizontally beyond these plates (Fig. 18). The end plates 58 and 59 complete the formation of a rigid metal shoulder-type supporting mechanism for the mold support or frame 16.

Frame 16 comprises horizontally disposed spaced parallel side members 60 and 61. Member 61 is an angle iron, while member 60 is a flat bar. The side members are attached at their outer ends (Figs. 1 and 2) by a connecting bar 62. The manner in which this bar 62 connects the side members 60 and 61 is perhaps best shown in Fig. 2. An angle 63 is welded, at 64, to the inner side of member 60 adjacent its outer end. One end of the connecting bar 62 is connected to the angle 63 by means of the bolted connection 65. To the inner side of angle member 61, adjacent its outer end, is welded a channel iron member 66. The bar 62 is connected to side 61 by means of the bolt 67.

Figures 3, 9:
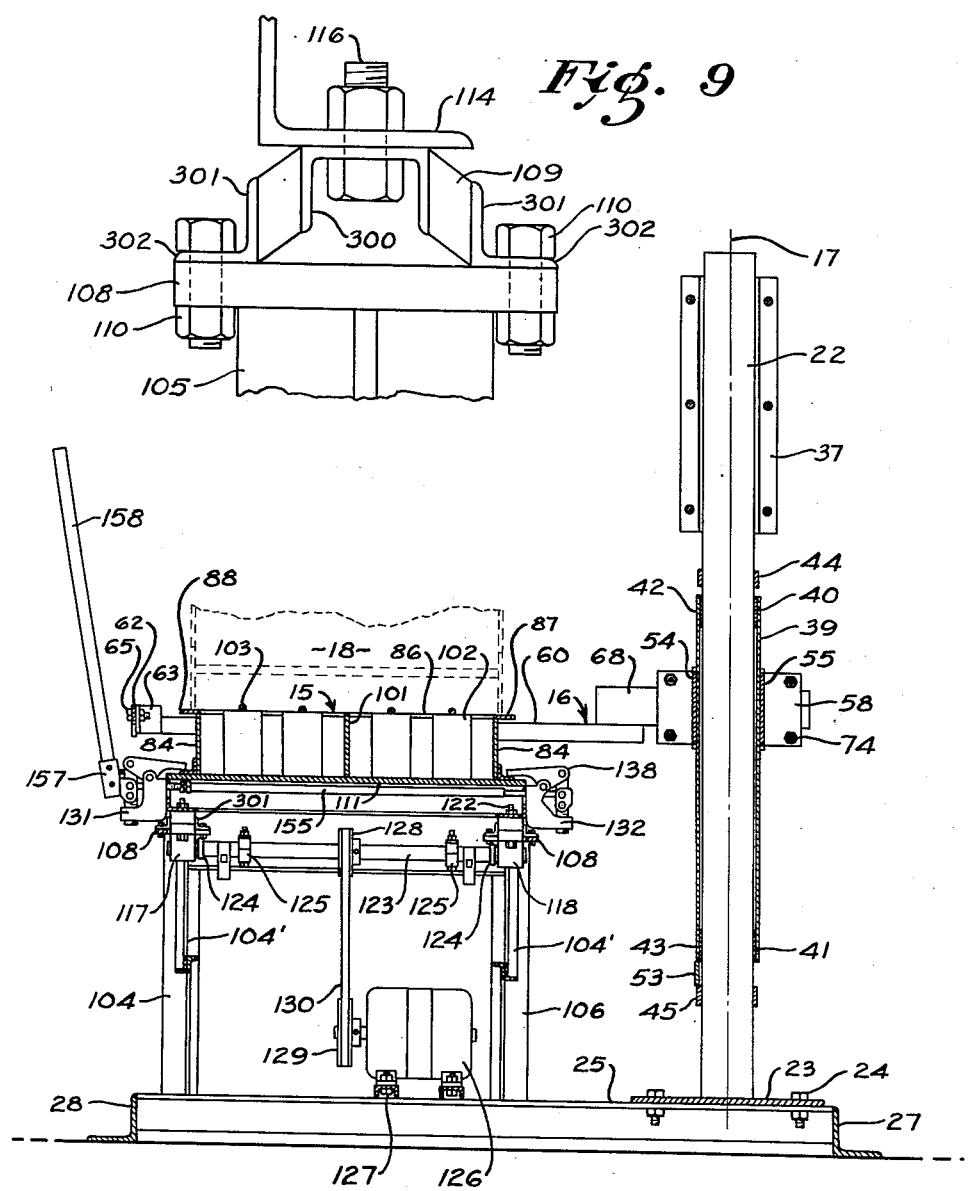
Fig. 3 is a sectional view, taken along plane 3—3 of Fig. 1.
Fig. 9 is an elevational view taken along plane 9—9 of Fig. 1.
Figure 6:
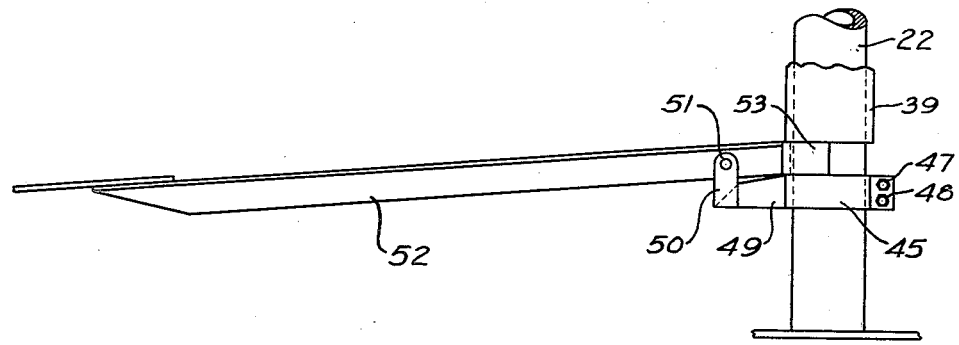
Fig. 6 is an elevational view, in enlarged detail, of the mold frame elevating mechanism.

The inner ends of the side pieces 60 and 61 of the mold supporting frame are detachably and adjustably connected to the before-mentioned end plates 58 and 59 of the rigid shoulder support. (Figs. 3 and 18.) Other views (Figs. 1 and 2) also show the adjustable connecting means for the frame side pieces 60 and 61. The inner ends of side frame portions 60 and 61 have welded thereto end members 68 and 69. The end members 68 and 69 are adjustable horizontally between dual, vertically disposed clamps 70 and 71 for the member 68 and vertical clamps 72 and 73 for the member 69. These plural vertical clamps, forming adjustable supporting means for the inner end of the mold supporting frame, have plural bolted connections 74 with end plates 58 and 59, as clearly shown in the several views heretofore referred to.

It is obvious that the clamping mechanism described secures the inner ends of the mold support upon the rigid shoulder mechanism made up of the before-mentioned plural steel support plates. Because of the considerable weight of the mold carried upon the outer end of the frame, adjustment mechanism is provided to ensure precise elevation and positioning of the mold, and which may be adjusted before clamps 70 and 71 are tightened.

This adjusting mechanism is provided by the upper and lower adjustment screws 75 and 76 (Fig. 18) of the drawings. These adjustment screws are threaded in nuts 77 and 78, welded upon the projecting ends of plates 56 and 57. The inner ends of the screws 75 and 76 contact the upper and lower sides of frame member 68 in a spaced manner to adjust precisely the position of the mold carried upon the outer and operating end of the frame 16. The before-mentioned adjustment screws 75 and 76, as well as the welded nuts 77 and 78, control the position of the inner end 68 of the frame. Similar adjustment screws 79 and 80, as well as welded nuts 81 and 82, control the position of the inner end 69 of frame or side member 61.

Detachably supported, or carried near the outer end of the mold support 16, is the mold 15. Referring to Figs. 2 and 3, this mold comprises vertical side members 84 and end portions 85. A top or mold-supporting plate 86 (Figs. 2 and 3) is welded on the top of frame members 84 and 85. This top plate 86 forms flanges 87 and 88 extending beyond the ends and sides of the mold frame. The side flanges are shown at 89 and 90. The flanges 89 and 90 are adapted to rest upon the upper edges of side frames 60 and 61. Side frame 60 has a rest pad 305 (Figs. 5 and 12) that contacts the lower side of plate 86 when the frame supports the mold 15. Flange 89 abuts the delivery end of hopper mechanism of any conventional design. However, in the lowered position of transfer frame 16, the mold plate 86 is free of the frame, as shown in Fig. 3. The flange 90 has a specific, detachable aligning connection with side arm 61. This alignment ensures accurate placing of the mold 15 on the arms 60 and 61 so that, when the mold is carried to the stripper mechanism, the stripper will be in proper position to strip the mold.

Side angle iron member 61 has a horizontal flange 61-a, said portion 61-a providing, through the mechanism now to be described, a support for the flange 90 and therefore one side of the mold. Upon side frame member 61-a, at spaced points beneath the overhanging flange 90, is centering lug 91 and positioning member 92 (Figs. 7, 8, 12, 15 and 16). The lug 91 has a conical centering portion. Member 92, formed of an angle iron, is arranged to have its corner or ridge radial with respect to the axis of pin or lug 91. Both the centering lug and positioning member are welded to the supporting frame at 93 and 94.

Upon the under-surface of the overhanging flange 90 of the mold plate 86 is welded a cooperating centering block 95, having a tapered space into which lug 91 can fit snugly. This centering block is fashioned, as shown at 96, to cooperate with the centering lug 91 definitely to fix and support one end of the mold plate upon the side frame 61-a. The positioning member 92 directly underlies an overhead, similarly shaped positioning member 97. The overhead positioning member 97 is attached to the underside of the flange 90 by aid of angle iron 98 welded to flange 90, as well as to member 97. Since both members 91 and 92 have sloping surfaces corresponding to sloping surfaces on members 95 and 97 as frame 16 is raised, the mold plate is automatically moved into the restraining position of Figs. 7 and 8. Any slight misalignment prior to the engagement of frame 16 with the mold is automatically corrected. The pin and groove restraint thus formed ensures against both angular and linear misalignment.

This positioning means might just as well be formed in some other shape and still accomplish the result desired; namely, the definite positioning and aligning of the mold plate, and thus the mold upon the frame 16, whenever it is desired that the mold and frame have an engaging connection.

Figure 15:
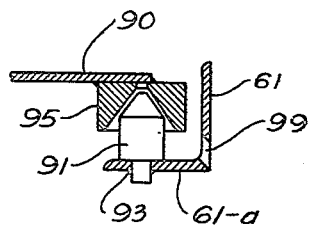
Fig. 15 is a sectional view, similar to Fig. 7, with the parts disengaged.
Figure 16:
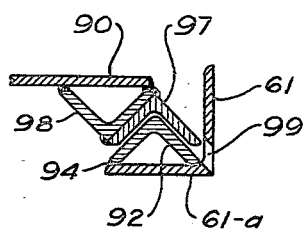
Fig. 16 is a sectional view, similar to Fig. 8, with the parts disengaged.

Figs. 15 and 16 in the drawings show the top mold plate, and thus the overhead positioning and centering portions separated slightly. This separation, and the reason therefore, will be described in detail later; and it is thought sufficient to say now that movement of the foot-operated lever 52 through various connections, and finally the side members 60 and 61, will permit raising and lowering of the mold. It is suggested here that the mold, when placed upon a support for the filling operation later to be described, may become detached from the frame 16 by lowering of the side members 60 and 61, thus moving the centering lug 91 and positioning member 92 from their cooperating overhead position as shown in Figs. 15 and 16. The side frame 61 has plural apertures 99 therein, permitting any fluid gathering upon the angle to drain therefrom.

The mold 15 has vertically disposed dividing members 100 and 101 in Figs. 2 and 3, the same permitting molding of four blocks in the single mold. Of course, either a single block, or a plural number of blocks, might just as well be formed in the mold by rearrangement of the dividing portions. Plural mold cores 102 are welded to mold core supporting bars 103, in turn welded upon top mold plate 86.

A vibratory mold support and filling station is disposed upon the foundation, directly beneath the mold and supporting frame, when said mechanism is in an abutting position immediately adjacent the conventional hopper mechanism (not shown).

The vibratory mold support is made up of the following parts:

Four vertically disposed angle iron legs 104, 105, 106, and 107 are welded to the sides of parallel base members 25 and 26, and may be appropriately braced, as indicated at 104' (Fig. 3). These uprights form corner posts. A pair of metal plates 108 (Figs. 2 and 3) are welded to the upper ends of the before-mentioned legs that extend transversely below the mold 15 and beyond the posts. These plates 108 form a stationary mounting for the vibrating parts of the machine.

Figure 17:
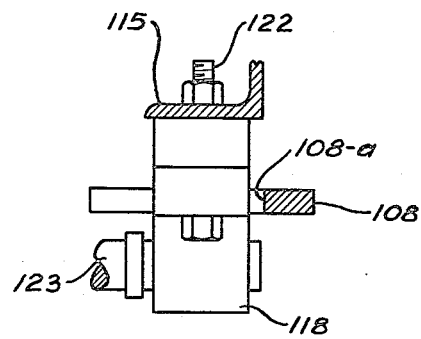
Fig. 17 is an enlarged sectional view of a portion of the vibratory mechanism.

Upon each of the ends of the stationary plates 108 a rubber vibration damper 109 (see also Fig. 9) is disposed and connected thereto by means of the plural bolt and nut connections 110. Inasmuch as these four vibration dampers are identical, as well as connected in the same manner, it is necessary to describe but one of them. In Figs. 1, 9, and 17 of the drawings, the vibration dampers or floating support members are shown in their relative positions and in enlarged detail.

A mold-supporting plate 111 is spaced from the stationary plates 108 by means of the vertically disposed steel angles 112 and 113 welded to the mold supporting plate 111, and depending downwardly and inwardly to form the dual flanges 114 and 115. The angles 112 and 113 extend downwardly from the side edges of the mold-supporting plate 111 (Fig. 1). The rubber elements 109 are made preferably from synthetic rubber able to withstand the constant vibrations without material deterioration. They are short blocks of substantially rhomboid cross-sections, two being provided at each mount. The inner vertical side of the members 109 are vulcanized to the vertical sides of channel 300 fastened, as by bolts 116, to the flange 114. The outer vertical sides are similarly vulcanized to the vertical flanges 301 of the angle irons 302 that are bolted to plate 108. Thus, the mold-supporting plate 111 has a floating connection with the stationary plate 108.

Means for vibrating the mold supporting plate 111 is provided in the following mechanism. The stationary plates 108 are apertured in the manner best shown, perhaps, at 108-a (Figs. 3, 11, and 17). Dual bearing supports 117 and 118 are fastened, by means of the plural bolt members 122, to the inwardly projecting flanges 114 and 115 of vibratory mold plate 111. The dual supports 117 and 118 carry the outer ends of a rotary shaft 123 (Fig. 3). Dual collars 124 position the rotary shaft, and upon said shaft are fixedly secured a plurality of adjustable eccentric weights 125.

Mechanism for rotating shaft 123 is provided in conventional electric motor 126, having the plural bolted connections 127 with the base members 25 and 26. Pulley 128 pinned to the rotary shaft 123, and pulley 129 pinned to the motor shaft, are connected by means of belt 130. Rotary movement of the shaft 123, by virtue of the eccentrically mounted weights thereon, transmits a vibratory movement to the mold support plate 111 without transmitting any vibration to the stationary plate 108 or the base and supporting means therefor.

In Figs. 3 and 10 of the drawings, there is shown manually operated mechanism for either clamping the mold 15 upon the supporting plate 111, or releasing it in a manner to permit elevation thereof and transfer to the press and stripper mechanism. This manually operated clamping mechanism includes supporting brackets 131 and 132 welded to angle irons 112 and 113 which, in turn, support the plate 111. Brackets 131 and 132 are disposed intermediate the ends of the angle irons 112 and 113. Pivoted at 133 and 134 to upwardly projecting ears 135 and 136 on the before-mentioned brackets 131 and 132 are dual clamps 137 and 138. Each bracket 131 and 132 has spaced ears 135, 136 between which extend the pivot pins 133 and 134. The clamps and jaw portions 139 and 140 thereof project inwardly in a manner to engage or release the lateral flanges of angle irons 85-a and 85-b welded to the lower ends of the mold frame.

Mechanism for actuating the clamps is provided in dual toggle arm members or clevises 141 and 142 which are pivotally connected at 143 and 144 to links 145 and 146. These links 145 and 146 are, in turn, pivoted to clamps 137 and 138 at 147 and 148 respectively. Toggle arms 141 and 142 are pivotally connected, at their lower ends at 149 and 150, to lugs 151 and 152 adjustably screwthreaded into outward projecting portions 153 and 154 of brackets 131 and 132.

Means for synchronizing the operation of the dual clamp and jaw members previously described is provided in a transversely disposed rod 155, pivotally connected at its opposite ends to the toggle pins 143 and 144. This rod extends through slots formed in the vertical legs of angle irons 112, 113. Means for varying the length of the rod 155, and therefore the bite of jaws 139 and 140, is found in a turnbuckle adjustment mechanism 156 and threaded lugs 151 and 152. A handle support 157 is welded to the outer side of toggle 141, said support being adapted to receive a manually operated handle member 158. A stop 159 on link 145 limits the inward movement of travel of the operating handle.

In Fig. 10 of the drawings, the operating handle has been moved to an outward position and the toggle mechanism, broken, with the result that the jaws 139, 140 of the clamping members are released from the mold frame; and thus the mold may be elevated and transported by means of its support to the stripping mechanism. In Fig. 3 of the drawing, the operating handle 158 has been moved to a substantially upright position wherein the toggle members 141 and 142 have been forced to a straight line position, with the jaws 139 and 140 clamped upon the projecting flanges of the mold frame. Since the toggle links 141, 145 and 142, 146 are substantially straightened when the mold 15 is clamped, a very large clamping force is secured.

It is, of course, apparent that vibration of the mold-supporting plate, and hence the mold, will operate to compact the molding material densely in the mold. The clamping mechanism heretofore described is absolutely necessary to hold the mold upon its support during the filling operation.

The press and stripper mechanism is carried on the rectangular frame portions, including the base 29 and vertical columns 22 and 30 (Fig. 1). The press mechanism includes a press plate 160 (Figs. 1 and 4) supported for reciprocatory vertical movement in the press frame. Dual, vertically disposed rods 161 and 162 are welded to the press plate at their lower ends. These vertically disposed rods project upwardly through the cross braces 32 and 35, being supported in a slidable manner by means of the tubular supports or bushings 163 and 164 in cross piece 35 and other tubular supports 165 and 166 in cross member 32. These elongated bushings, which are in the nature of tubular supports, permit vertical elevation and depression of the rods 161 and 162 in a manner to accomplish the press operation.

Rods 161 and 162 have secured to their upper ends, as at 167 and 168, a cross head 169 which, in turn, has an upwardly disposed link 170 pivoted thereto at an intermediate point 171, the upper end of said link 170 being pivoted at 172 to the inner end of a counterbalanced lever 173. Lever 173 is pivoted at 174 to the upper end of a vertically disposed standard 175 welded at its base 176 to cross piece 32. A counterweight 177 is secured to the outer end of lever 173.

Figure 19:
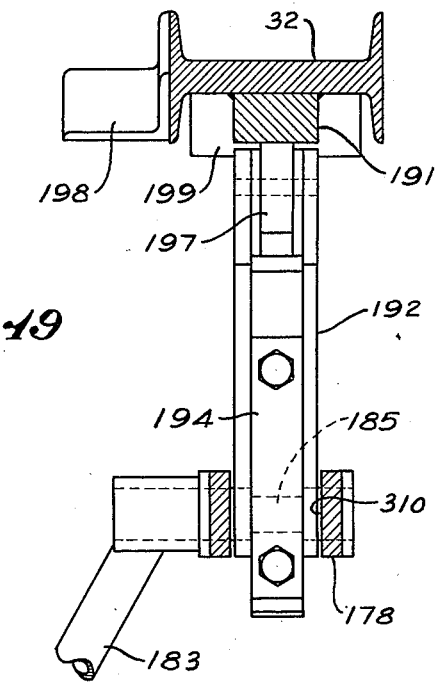
Fig. 19 is a sectional view, taken along plane 19—19 of Fig. 14.

Manually operated lever and cam mechanism for depressing and elevating press plate 160 will now be described. A cross piece 178 (see also Figs. 13, 14 and 19), forming a support for the lever mechanism, is secured to rods 161 and 162 by means of the dual collars 179 and 180 adjustably connected in the manner clearly shown at 181 and 182. These collars, and therefore the member 178, are thus vertically movable along with stems 161 and 162. Member 178 has a wide slot 310.

Figure 13:
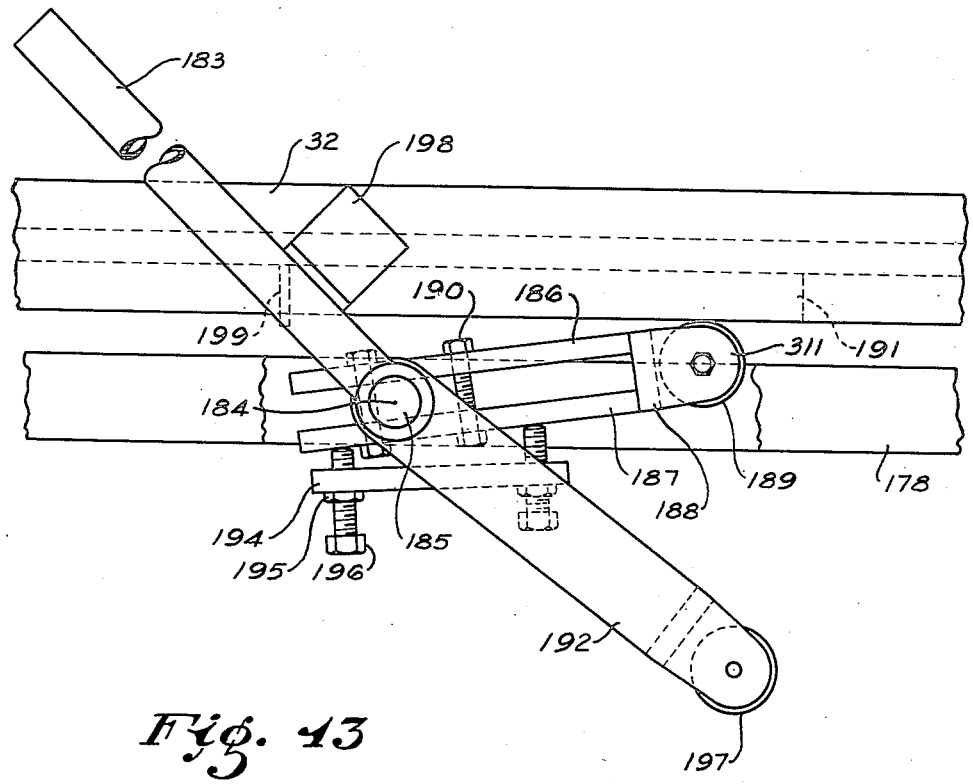
Fig. 13 is an elevational view, in enlarged detail, of the press lever mechanism.
Figure 14:
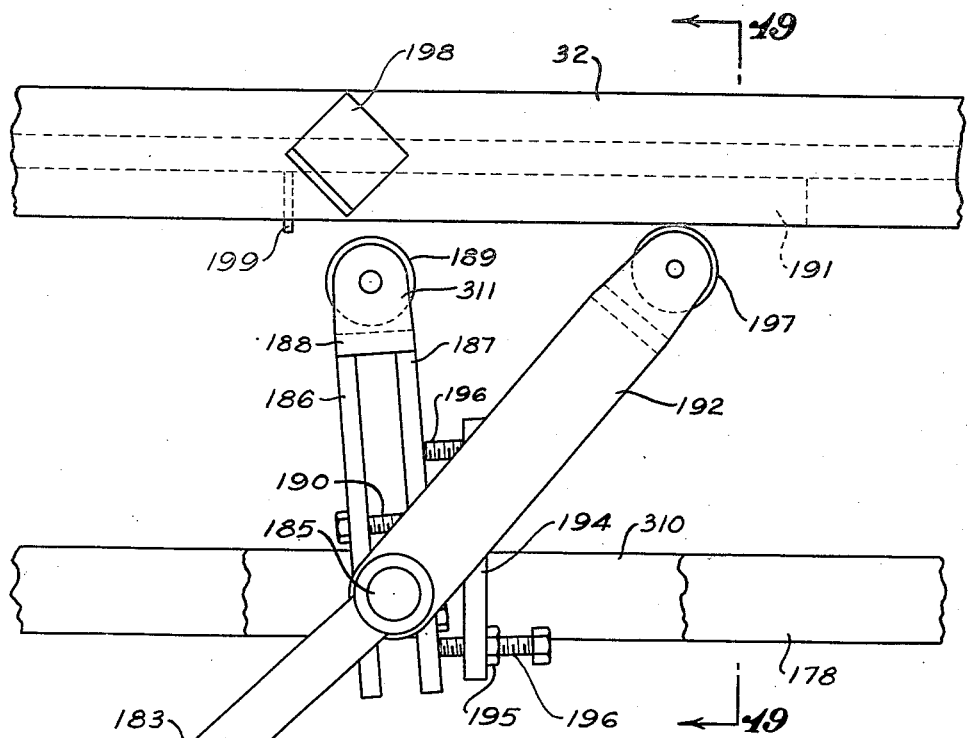
Fig. 14 is an elevational view, in enlarged detail, of the press lever mechanism in another position of movement.

The specific lever mechanism is best shown in Figs. 1, 13, 14, and 19 of the drawings. Fig. 13 illustrates the beginning of the stripping operation, and Fig. 14 illustrates the end period thereof. Manually operated press lever 182 is pivotally mounted at 184 on cross piece 178. This pivot 184 formed by a transverse pin 185 supported in the before-mentioned cross piece 178, and extends across slot 310. The pin 185 is flattened, intermediate its length, to receive the bifurcated ends 186 and 187 of a short actuating lever 188 carrying a roller 189 mounted in clevis 311 on the end of lever 188. Accordingly, as handle 183 is rotated in a clockwise direction, the roller 189 rolls on plate 191 and the member 178 is urged downwardly. The inwardly projecting ends 186 and 187 of the short lever 188 are clamped upon the flattened portion of pin 185 by means of the dual bolt and connecting members 190. The roller cam portion 189 of the short lever engages the under-surface of a cam plate 191 welded upon the lower side of cross piece 32.

A second, and somewhat longer lever 192, is mounted for rotation on shaft 185, but it is moved by interconnected parts between it and the short lever 186. This lever 192 is bifurcated to embrace the lever 186. A plate 194 is welded on lever 192, said plate having dual, threaded nuts 195 welded thereon in such manner that threaded adjustment screws 196 may be supported therein, with their inner ends projecting to engage arm 187 of short lever 188 on opposite sides of shaft 185. A cam roller 197 is carried on the operating end of lever 192. A stop 198, welded upon cross piece 32, determines the position of upward movement of the press or lever mechanism heretofore described.

It would seem clear from consideration of Figs. 1, 13 and 14 that downward movement or press action of plate 160 is accomplished by manual movement of press lever 183. Actuation of lever 183 and engagement of the cam roller 189 with the cam plate 191 moves the cross piece 178, the dual rods 161, 162, and attached press plate 160 downwardly in a somewhat gradual manner to exert great force on the block. Referring specifically to Fig. 14, we find the longer lever 192 has been moved by the manual member 183 to a position where the cam roller 197 engages the cam plate 191. Further downward movement of the manual lever 183 hastens the descent of press plate 160 and attached stripper mechanism.

By provision of the adjustment screws 196, the relative angular position of arms 188 and 192 can be determined so as to adjust the point where the long arm 192 takes over the function of moving the presser assembly downwardly.

Briefly, the lever mechanism, through the specific positioning of the short and longer lever parts, operates to exert a slow, but powerful, pressing action which is initially desired in stripping the blocks from the mold. Following the initial pressing operation, it is possible to accelerate the downward movement of the press plate by having the longer lever 192 engage the cam plate 191 and thus to hasten the stripping action. A stop lug 199 controls the limit of operative movement of lever 192.

The press plate 160 (Figs. 1, 2 and 4) has adjustably mounted thereon stripper mechanism of any design or shape desired. In the present instance, we find a supporting member 200 having the downwardly depending spacer bolts 201 welded at their lower ends to plural stripper plates 202. These plates are formed accurately to conform to the upper areas of the molded blocks. Supporting member 200 has a detachable connection with press plate 160 through the plural bolt and nut connections 203. In Figs. 1, 2, and 4, the stripper plates 202 are designed to engage the upper surface of the blocks contained in the mold and thereafter, by first gradual and then accelerated movement, to strip the blocks from the mold onto the pallet 21.

The press and stripping action follows the transfer of the filled mold by its support from the filling station to a position directly beneath the stripper mechanism. To ensure positive aligned location of the mold beneath the stripper plates, there is provided the following mechanism for supporting and securing the movable mold frame on the press frame.

This mechanism includes (Figs. 1 and 5) a vertically disposed member 204 welded at its lower end to beam 29, there being an additional bracing 205 welded at one end to the vertical member 204, as at 206, and at its other end 207 to the vertical frame support 30 of the press mechanism. A plate 208 is adjustably connected to the vertical member 204, as at 209. Plate 208 has bolted thereon, centering member or lug 211. Referring to Fig. 1, the connecting bar 62 for side members 60 and 61 is notched in the concave manner shown at 212.

It is apparent that movement of the mold support to a position underlying the stripper mechanism will result in engagement of the aligning lug 211 with notch 212 and thus to definite positioning of the filled mold beneath the stripper plates. A stop 312 engages the left-hand side of lug 211, and further assists in ensuring accurate alignment between the frame 16 and the stripper mechanism.

Figure 5:
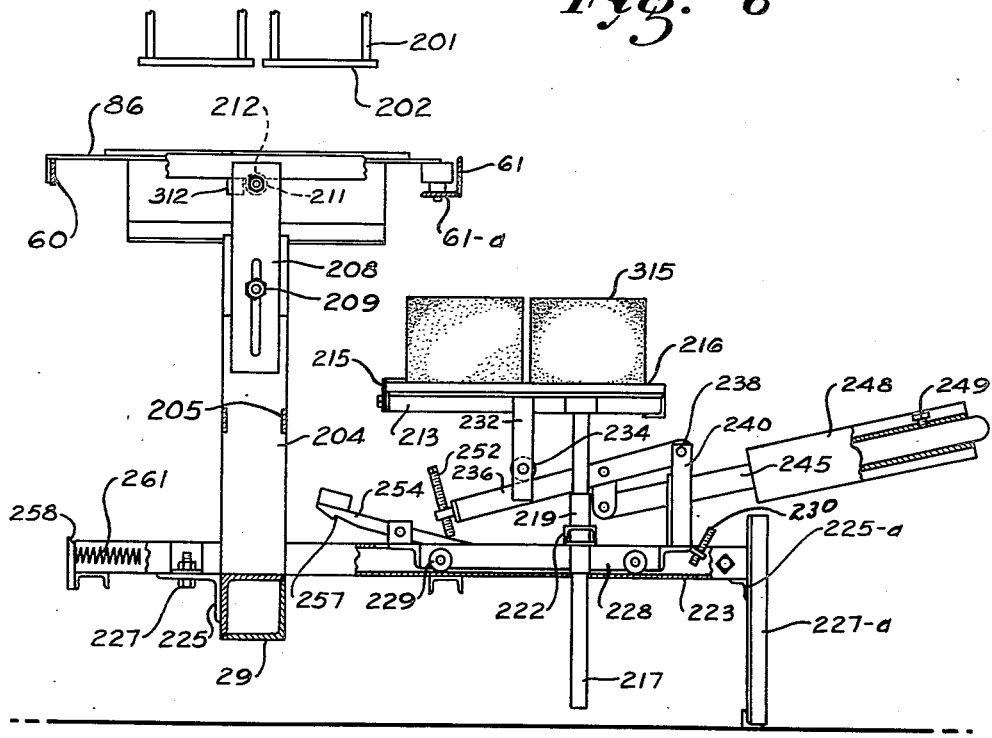
Fig. 5 is a side elevational view, partly in section, taken along plane 5—5 of Fig. 1, and showing the pallet support in loaded position.

The pallet-supporting mechanism, although shown in assembled relationship with the press and stripper mechanism (Figs. 1 and 2), is more clearly shown in Figs. 4 and 5 of the drawings. Fig. 5 shows the loaded pallet 216, blocks 315 having been deposited thereon while the pallet was under the stripper mechanism. The support generally referred to heretofore as 21 comprises a pallet-supporting frame 213, said frame having adjustably secured to its forward edge, as shown at 214 (Fig. 1) a mold pallet positioning frame member 215. The pallet 216 is adapted to rest on frame 213 with one edge against the member 215.

Mechanism for collapsibly supporting the pallet frame 213 is provided in the following mechanism: dual pallet-supporting rods 217 and 218 are welded to the under-surface of the pallet, said rods sliding vertically through dual elongated supporting tubes 219 and 220 secured, as at 221 and 222, to a carriage 228 movable transversely in spaced frame track members 223 and 224. The tracks 223, 224 are connected at their forward ends to the hollow beam 29 by means of the dual attachment angles 225 and 226, suitably bolted to the tracks, as at 227 and 228, said angles being welded to the beam 29. (Figs. 4 and 5).

The tracks 223 and 224 are U-shaped in cross section, the outwardly projecting ends thereof having a plural welded connection with cross-pieces 225-a and vertically disposed dual supports or leg members 226-a and 227-a. The carriage 228, upon which dual pallet supporting rods 217 and 218 find tubular support, has plural roller members 229 upon either side thereof movable in the before-mentioned U-shaped frame members 223 and 224. This reciprocatory rolling movement of the carriage 228 in the frame members is best shown in Fig. 5 of the drawings. In this way, the loaded pallet 216 can be moved out from under the stripper mechanism.

A counterbalanced mounting for the pallet is provided as follows: downwardly depending, laterally disposed pairs of strips 231 and 232, having rollers 233 and 234 pivoted thereon, engage in a sliding manner the forwardly projecting links 235 and 236. Links 235 and 236 are pivoted at 237 and 238 to dual pairs of vertically disposed supports 239 and 240, said supports being welded at their lower ends upon the carriage 228. Links 235 and 236 are connected by means of a cross member 241 upon which dual depending short links 242 and 243 are pivoted intermediate the length of said cross piece (Fig. 1).

The lower ends of the short links 242 and 243 are connected by means of the pivot 244 to the inwardly projecting end of counterbalance lever 245 which, in turn, has a pivotal mounting 246 at the upper end of a pair of vertically disposed supports 247 on the carriage 228 (Fig. 1). A counterweight 248 is adjustably secured as at 249 to lever 245.

The weight of blocks 315 is sufficient to depress the frame 213 to the position of Fig. 5 against the action of the counterweight 248 and thus clear the machine for further operation. A stop 230 limits downward movement of counterweight arm 245. In this process, rollers 234 roll on arms 235, 236, whereby the weight of the blocks is effective to raise the counterweight 248.

A cross member 250 connects the inwardly projecting ends of links 235 and 236 and, attached to this member at an intermediate point 251, is a trigger 252 having a screw-threaded adjustable mounting 253.

Latch mechanism is provided for holding the pallet supporting carriage 228 in its forward position on the tracks 223 and 224, with the pallet 216 in operative position directly beneath the mold, mold support, and stripper mechanism.

This mechanism includes a latch 254 pivoted at 255 on an upwardly projecting lug 256 secured to the forward end of the carriage 228. The hooked portion 257 of the latch is adapted to engage the upwardly extending lip 258 on cross bar 259, connecting the inner ends of tracks 223 and 224 (Fig. 4). The disengaged position of the latch and carriage is shown in Fig. 5.

Actuation of the latch 254 is obviously accomplished by downward movement of the trigger 252, whereupon the carriage 228, supporting the pallet and plural blocks, is initially urged rearwardly by the expansive action of spring 261. The track members 223 and 224 have a slight rearward slope, permitting the carriage to roll to its rearward position against the arresting springs 260.

After removal of the pallet 216 with molded blocks 315 thereon, the carriage 228 can be returned and latched.

The adjustable frame 213 ensures proper placement of a new pallet thereon during each successive operation.

Duel springs 260 within the rearward ends of frame members 223 and 224 arrest the movement of the carriage in that direction. Similarly, a spring 261 secured, to the lug or lip 258 on cross bar 259, operates to arrest the forward movement of the carriage.

In view of the preceding description, the operation of the block-molding machine is believed reasonably clear. However, it might be well to summarize briefly the operation beginning with the movement of the mold support 16 and mold 15 to a position at the filling station, with the top mold plate 89 abutting a conventional hopper mechanism, and the supporting frame 16 disengaged from the mold, the pedal 52 being released. The mold frame 15 is clamped to the vibratory mold support by manual movement of the operating handle 158 to an inward position.

The filling operation completed and the mold released, the operator then depresses the foot-operated lever 52 with a resulting upward movement of the mold support or frame 16. The mold supporting frame is then rotated through an arc of 90° into operative engagement with the press and stripper mechanism. When the notch 212 on the end of the mold support engages the centering lug 211 on the press frame, the mold will lie directly beneath the press mechanism and the stripper plates will be aligned with the concrete filled portions of the open-ended mold.

Manual operation of the press and stripping devices, through movement of the specific lever mechanism shown in Figs. 13 and 14, results in, first, a gradual loosening of the blocks tenaciously held in the mold, and then a more rapid descent of the stripper plates to force the molded blocks free of the mold on to the depressible pallet 216. The molded blocks are sufficiently heavy to depress the frame 213 against the counterweight 248, with consequent release of the carriage mechanism and rearward movement of the pallet to a position where the operator may readily remove the molded blocks and mold board.

Return of the mold support and mold to the filling station through an arc of 90° obviously expedites the molding operation. Elevation of the mold support by means of the foot-operated lever 52 is essential to proper placement of the mold upon the vibratory support, whereupon release of the foot-actuated lever will result in a lowering of the side frame members and detachment from the mold. The operator may quickly clamp the mold upon the vibratory support, with the positioning and centering mechanism spaced for proper reengagement following the filling and vibratory operations.

The inventor claims:

1. In a molding apparatus: an open-ended mold; a mold filling station structure; a mold stripping station structure; a support movable between said station structures for transporting filled molds from the filling station structure to the stripping station structure; means for raising or lowering said support to raise or lower the mold from or onto the filling station structure, said support being free of the mold when the mold is in operative relation upon the filling station structure; said mold and support having cooperating parts restraining the mold from all relative movement and ensuring a definite alignment between the mold and the support; and cooperating mechanism on the mold support and stripping station structure for aligning the support at the stripping station structure.

2. In a molding apparatus: an open ended mold; a vibrator for the mold upon which the mold may be supported during filling; a stripping station structure; a support for the mold for transporting the filled mold to the stripping station structure; means for raising the support to lift the mold from the vibrator; cooperating aligning means restraining the mold from all relative movement on the support to ensure that when the mold is lifted, the mold will be in definite alignment with the support; and cooperating mechanism on the mold end of the support and stripping station structure for aligning the support at the stripping station structure.

3. In a molding apparatus: a mold; a filling station structure for the mold; a stripping station structure for the mold; a support movable about a vertical axis for transporting the mold between said structures; means for raising and lowering said support to raise and lower the mold from and upon the filling station structure; and cooperable means on said stripping station structure and support for aligning said stripping station structure and mold upon rotation of said support to said stripping station structure.

4. In a molding apparatus: a mold; a filling station structure for the mold; a stripping station structure for the mold; a support movable about a vertical axis for transporting the mold between said structures; and means for raising and lowering said support to raise and lower the mold from and upon the filling station structure.

5. In a molding apparatus: a mold; a filling station structure for supporting the mold; a stripping station structure for the mold; a vertical column; a support rotatable upon said column for transporting the mold between said structures; and means for raising and lowering the support on said column to raise and lower the mold from and upon the filling station structure.

6. In a molding apparatus: a mold; a filling station structure for supporting the mold; a stripping station structure for the mold; a vertical column; a support rotatable upon said column for transporting the mold between said structures; means for raising and lowering the support on said column to raise and lower the mold from and upon the filling station structure; and cooperable means on said stripping station structure and support for aligning said stripping station structure and mold upon rotation of said support to said stripping station structure.

STEPHEN FLAM.

REFERENCES CITED

The following references are of record in the file of this patent:

UNITED STATES PATENTS

| Number | Name | Date |
|---|---|---|
| 868,730 | Tubesing | Oct. 22, 1907 |
| 1,288,534 | Dupuy | Dec. 24, 1918 |
| 1,408,558 | Zophy | Mar. 7, 1922 |
| 1,493,732 | Camp | May 13, 1924 |
| 1,707,994 | Romie | Apr. 9, 1929 |
| 1,899,137 | Crume | Feb. 28, 1933 |
| 2,319,313 | Flam | May 18, 1943 |
| 2,342,440 | Whitsitt | Feb. 22, 1944 |
| 2,353,492 | O'Connor | July 11, 1944 |
| 2,397,695 | Schutt | Apr. 2, 1946 |
| 2,413,109 | Leipold et al. | Dec. 24, 1946 |

FOREIGN PATENTS

| Number | Country | Date |
|---|---|---|
| 72,067 | Norway | May 5, 1947 |